United States Patent
Lea et al.

(10) Patent No.: US 11,965,415 B2
(45) Date of Patent: Apr. 23, 2024

(54) METHOD OF EXTENDING A BOREHOLE OF A RELIEF WELL, BOTTOMHOLE ASSEMBLY, DRILL STRING, AND OTHER APPARATUS

(71) Applicant: Well Intercept AS, Stavanger (NO)

(72) Inventors: Espen Lea, Sola (NO); Jostein Tysse, Hafrsfjord (NO); Arild Saasen, Gullaug (NO)

(73) Assignee: Well Intercept AS, Stavanger (NO)

( * ) Notice: Subject to any disclaimer, the term of this patent is extended or adjusted under 35 U.S.C. 154(b) by 435 days.

(21) Appl. No.: 17/286,995

(22) PCT Filed: Oct. 22, 2019

(86) PCT No.: PCT/NO2019/050226
§ 371 (c)(1),
(2) Date: Apr. 20, 2021

(87) PCT Pub. No.: WO2020/085916
PCT Pub. Date: Apr. 30, 2020

(65) Prior Publication Data
US 2021/0388713 A1 Dec. 16, 2021

(30) Foreign Application Priority Data
Oct. 22, 2018 (NO) .................................. 20181353

(51) Int. Cl.
*E21B 47/022* (2012.01)
*E21B 47/0228* (2012.01)
(Continued)

(52) U.S. Cl.
CPC ........ *E21B 47/022* (2013.01); *E21B 47/0228* (2020.05); *G01V 3/26* (2013.01); *E21B 47/024* (2013.01)

(58) Field of Classification Search
CPC .... E21B 47/02; E21B 47/022; E21B 47/0228; G01V 3/26
See application file for complete search history.

(56) References Cited

U.S. PATENT DOCUMENTS

| 4,372,398 A | 2/1983 | Kuckes |
| 5,230,387 A | 7/1993 | Waters et al. |

(Continued)

FOREIGN PATENT DOCUMENTS

| WO | 2014089505 | 6/2014 |
| WO | 2018052453 | 3/2018 |

OTHER PUBLICATIONS

Norwegian Search Report for NO 20181353, dated Aug. 13, 2019.
International Search Report and the Written Opinion for PCT/NO2019/050226, dated Jan. 7, 2020.

*Primary Examiner* — Christopher J Sebesta
*Assistant Examiner* — Lamia Quaim
(74) *Attorney, Agent, or Firm* — Andrus Intellectual Property Law, LLP (57) ABSTRACT

A method, drill string, bottomhole assembly, drill bit, and insert are for extending a borehole for a relief well in a subsurface. The rotary drill string is provided in the borehole and includes a bottomhole assembly. The bottomhole assembly includes a drill bit. Current is provided into the subsurface using at least one electrode on the drill string, thereby generating current in a casing of a mother well located a distance away from the borehole of the relief well. At least one component of a magnetic field associated with the current generated in the casing is detected using at least one sensor disposed on the drill string. Data is obtained from the sensor for determining either or both the proximity and direction to the mother well. The drill string is advanced into the subsurface based upon the obtained data to extend the borehole.

13 Claims, 10 Drawing Sheets

(51) Int. Cl.
*G01V 3/26* (2006.01)
*E21B 47/024* (2006.01)

(56) References Cited

U.S. PATENT DOCUMENTS

| | | |
|---|---|---|
| 2007/0126426 A1 | 6/2007 | Clark et al. |
| 2009/0078429 A1 | 3/2009 | Du et al. |
| 2010/0155138 A1* | 6/2010 | Kuckes ............... E21B 47/022 175/45 |
| 2015/0004004 A1* | 1/2015 | Lindsay ............... E21B 43/12 417/48 |

* cited by examiner

METHOD OF EXTENDING A BOREHOLE OF A RELIEF WELL, BOTTOMHOLE ASSEMBLY, DRILL STRING, AND OTHER APPARATUS

CROSS-REFERENCE TO RELATED APPLICATIONS

This application is the U.S. national stage application of International Application PCT/NO2019/050226, filed Oct. 22, 2019, which international application was published on Apr. 30, 2020, as International Publication WO 2020/085916 in the English language. The International Application claims priority of Norwegian Patent Application No. 20181353, filed Oct. 22, 2018. The international application and Norwegian application are both incorporated herein by reference, in entirety.

FIELD

The present invention relates to wells, well construction and drilling operations, and in particular to relief well drilling. More specifically, it relates to a method of extending a borehole for a relief well, and related apparatus including a drill string and bottomhole assembly.

BACKGROUND

In various situations, it may not be possible to access a well directly. This might be the case where it may not be feasible to run equipment in through the top of the well to conduct work in the well. In the event of a blowout for instance, it may be desirable to plug the well by delivering cement into the wellbore at a specific location deep in the subsurface.

To deal with the problem of access to a "mother" well, a "relief" well may be drilled from another location to meet the mother well at the required depth. It may then be desired that the drill bit of the drill string used to drill the relief well be directed so as to pierce through the casing of the mother well. Access to the mother well deep in the subsurface can then be obtained through the relief well. In the case of the blow out for example, cement could be delivered from the relief well and into an annulus or bore within the subsurface casing of the mother well.

Drilling and constructing the relief well is traditionally time consuming and costly. Typical practice is to drill past the mother well and then turn back towards the mother well and intersect that close to the bottom of the casing. One of main challenges critical to success is to advance the drill bit at the end of the borehole into the correct position with respect to the mother well.

Although drill strings used for directional drilling often include compasses, the uncertainty as to the exact position of the drill bit is generally high, especially in regions where the Earth's magnetic field is steeply inclined.

Conventionally, when the relief well reaches the vicinity of the mother well, the drill string is pulled out and a ranging tool is run in on a wireline. The patent publication U.S. Pat. No. 4,372,398 describes a typical ranging tool. The ranging tool is used for measuring the direction and distance to the casing of the mother well. The ranging tool injects electric current into the Earth, and a component of the magnetic field returned from the casing is detected.

Once measurement using the ranging tool has been performed, the ranging tool is pulled out, the drill string is run into the borehole, and drilling is resumed. The direction of drilling may then be corrected and the borehole extended into the subsurface based on the measurement from the ranging tool. This process is typically repeated several times. For "good" progress to be maintained, a significant period of drilling needs to be conducted to extend the borehole before pulling out again and running the ranging tool back in on the wireline. The drilling is thus performed based on previously collected data from the ranging tool at a location increasingly far away from the actual location of the drill bit in the end of the hole. Such "intermittency" may result in error or deviation of the borehole from desired trajectory of the relief well borehole in the subsurface. It may then be a challenge to intersect the casing of the mother well in the subsurface in proper or desired location.

SUMMARY

At least one aim of the invention is to obviate or at least mitigate one or more drawbacks associated with prior art techniques.

In light of the above, according to a first aspect of the present invention, there is provided a method of extending a borehole for a well, e.g. a relief well, in a subsurface of the Earth, the method comprising the steps of: providing a rotary drill string in the borehole; injecting current into the subsurface using at least one electrode disposed on the drill string, thereby generating current in a casing of another well, e.g. a mother well, which is located a distance away from the borehole of the well; detecting at least one component of a magnetic field which is associated with the current generated in the casing, using at least one sensor disposed on the drill string; obtaining data from the sensor for determining either or both the distance and direction to the other well; and advancing the drill string into the subsurface based upon the obtained data to extend the borehole.

Preferably, the drill string includes a bottomhole assembly, and preferably the bottomhole assembly includes at least one tubular or sub and a drill bit connected to an end of the tubular or sub. The current may be injected into the subsurface using at least one electrode dispose on the tubular body or sub of the drill string, thereby generating the current in the casing of the other well. The electrode may be supplied with electrical power from a power source at surface. The tubular or sub may have a length uphole of the electrode that may be non-conductive or electrically insulated from the subsurface surroundings and a length downhole of electrode that is non-conductive or electrically insulated from the subsurface surroundings, for localised injection of current from the electrode into the subsurface. Return electrical current from the subsurface may be returned from downhole of the electrode through the drill bit, or through a length of walling of the tubular or sub, wherein these may be in electrical coupling with the subsurface. The sensor may be disposed on the drill string in a location between the electrode and the drill bit or between the electrode and the length of walling that can couple to the subsurface and through which the electrical current may be returned.

Current may thus be received at the string and returned from the subsurface through a coupled part, i.e. the tubular, the sub or the bit, downhole of the injecting electrode. The injecting electrode may comprise a discrete conductive terminal on an outer surface of a tubular wall section of the string.

The electrode may be disposed in the bottomhole assembly. The sensor may be positioned in the bottomhole assembly in any of: the drill bit; a drill bit sub, or a location along the drill string between the drill bit and the electrode.

The sensor, e.g. magnetometer, may be arranged between the receiving length and the injection electrode.

The sensor may comprise at least one magnetometer, and the method may further comprises using the magnetometer to detect the component of the magnetic field.

The injecting electrode may be a first electrode of the transmitter, and the transmitter may have a second electrode, which may be in the form of the drill bit, sub, or outer walling of tubular which in use is electrically couples to the subsurface. The string components of the drill bit, sub, or tubular downhole of the electrode can provide a large conductive body in the subsurface which can facilitate receiving and returning electrical current from the subsurface.

The method may further comprise rotating the drill string to drill a section of the borehole and advance the drill string in the subsurface.

The method may further comprise pausing the rotation of the drill string, and injecting the current into the subsurface in the pause. The data from the sensor may be obtained in the pause.

The method may further comprises performing, simultaneously, the steps of: rotating the drill string to drill a section of the borehole; and injecting the current into the subsurface.

The method may further comprise rotating the drill string to drill a section of the borehole, wherein the data may be obtained from the sensor simultaneously to the rotation. The method may comprise communicating or streaming the data from the sensor toward surface using telemetry.

The method may further comprise processing the data to determine the proximity and/or direction to the casing of the mother well.

The method may further comprise transmitting correctional data based on the processed data to a directional drilling system to adjust a heading of the drill string.

The method may include supplying the electrode with electrical power from a power source at surface or from a power source located downhole. The method may further comprise circulating drilling fluid along the drill string to produce electrical power, and supplying the electrode with the produced power to inject the current into the subsurface. Significantly greater electrical power may be deliverable from a power source at surface.

The second electrode is preferably provided by one or more conductive parts of the drill bit or drill bit sub or external walling of a length of tubular downhole of the electrode, these arranged to obtain electrical coupling with the subsurface in use. The part of the drill bit may comprise e.g. a cutting surface or cutting element of the drill bit. Either or both of the first and second electrodes may be located in the bottomhole assembly. The method may include injecting current alternatingly into the subsurface through first or second electrodes.

The method may include conducting current from the subsurface through any of: at least one electrode; the drill bit; and a conductive, e.g. outer, wall portion of walling of any of the drill string, the bottomhole assembly, and a tubular or a drill bit sub thereof.

The injected current may comprise an alternating current signal having a frequency of 1 Hz or lower, for example 0.5 Hz or lower, or 0.25 Hz or lower.

Power communication or conduction of current along the string between the electrode and power source may preferably be through a wall of the string e.g. in embedded wires or in the material of the wall of the tubular.

According to a second aspect of the present invention, there is provided a bottomhole assembly for a rotary drill string for drilling a borehole in a subsurface of the earth, the assembly comprising: at least one tubular or sub; a drill bit connected to an end of the tubular or sub; at least one electrode for injecting electrical current into the subsurface into which the drill string penetrates and the bottomhole assembly is located in use; and at least one sensor for detecting at least one component of a magnetic field.

The electrode may be arranged on an outer surface of the tubular or sub.

Upon use in connection with a relief well, the electrode can inject an electrical current into the subsurface that can generate an electrical current along a section of casing of the mother well located a distance apart from the relief well borehole within the subsurface.

The sensor can then be arranged to detect the magnetic field associated with the current in the section of casing of the mother well. This can facilitate determination of the proximity and direction, e.g. azimuthal angle to the mother well casing. Magnetic north may be measured using a compass which may be included in the drill string or bottomhole assembly.

The bottomhole assembly may be configured to provide electrical current communication through a wall of the tubular or sub for supplying electrical power to the electrode for injecting electrical current into the subsurface. The bottomhole assembly may be configured to provide electrical current communication through a wall of the tubular or sub for return electrical current path from the subsurface, e.g. in the material of the wall or walling thereof.

The bottomhole assembly may further comprise at least one electrical conductor or wire in a wall of the tubular or the sub for connecting the electrode to an electrical power supply. The electrode may be disposed on an outer surface of a stabilizer, joint, centraliser, or collar.

The bottomhole assembly may further comprise a power source or a downhole electrical power generator for providing power for the electrode for injecting current into the subsurface.

First and second electrodes of the bottomhole assembly may be disposed on the tubular body and in different locations along the tubular body.

The drill bit may comprise or consist essentially of non-magnetic material or material of low magnetic susceptibility.

The sensor may be positioned in a length section thereof which may comprise or consist essentially of non-magnetic material or material of low magnetic susceptibility, e.g. which does not interfere with the detection of field by the sensor.

The sensor may be arranged in the drill bit or a drill bit sub. The tubular body may have a central long axis and the sensor may be positioned inside the tubular body on the central axis.

In at least a length of the tubular or sub including the electrode, the tubular or sub may be electrically insulated from the subsurface surroundings. In said length, the tubular or sub may comprise or consist essentially of non-conductive material, or the tubular walling of the tubular or sub may comprise an outer layer of insulation around an inner conductive part of the tubular walling.

According to a third aspect of the invention, there is provided a rotary drill string for drilling a borehole in a subsurface of the earth, the assembly comprising: end-to-end connected tubulars of drill pipe; a bottomhole assembly comprising at least one tubular or sub; a drill bit connected to an end of the bottomhole assembly; at least one electrode for injecting electrical current into the subsurface into which the drill string penetrates in use; and at least one sensor for detecting at least one component of a magnetic field.

The electrode may typically be disposed on an outer surface of at least one of the tubulars or the sub.

The bottomhole assembly may typically be the bottomhole assembly according to the second aspect of the invention.

According to a fourth aspect of the invention, there is provided a drill string or bottomhole assembly for use in the method of the first aspect of the invention.

According to a fifth aspect of the invention, there is provided a sub for a drill string or bottomhole assembly, the sub comprising: a tubular body; at least one electrode disposed on the tubular body for injecting electrical current into a region surrounding around the tubular body section. The sub may further comprise at least one sensor for detecting at least one component of a magnetic field.

According to a sixth aspect of the invention, there is provided an insert for a drill string or a bottomhole assembly, the insert comprising: a tubular sleeve arranged to be received within the drill string or bottomhole assembly; at least one sensor supported on the sleeve for detecting at least one component of a magnetic field; at least one electrode or electrical connector for obtaining electrical connection to the electrode.

According to a seventh aspect of the invention, there is provided a drill bit or drill bit sub including a sensor operable for detecting at least one component of a magnetic field. The drill bit or sub may comprise or consist essentially of material which is non-magnetic or of low magnetic susceptibility.

Further aspects of the invention are set out in the independent claims appended hereto.

Any of the various aspects of the invention may include further features as described in relation to any other aspect, wherever described herein. Features described in one embodiment may be combined in other embodiments. For example, a selected feature from a first embodiment that is compatible with the arrangement in a second embodiment may be employed, e.g. as an additional, alternative or optional feature, e.g. inserted or exchanged for a similar or like feature, in the second embodiment to perform (in the second embodiment) in the same or corresponding manner as it does in the first embodiment.

Various further advantages of the embodiments of the invention and its features are described and will be apparent from the specification throughout.

BRIEF DESCRIPTION OF THE DRAWINGS

There will now be described, by way of example only, embodiments of the invention with reference to the accompanying drawings, in which.

DETAILED DESCRIPTION OF THE DRAWINGS

Figure 1:
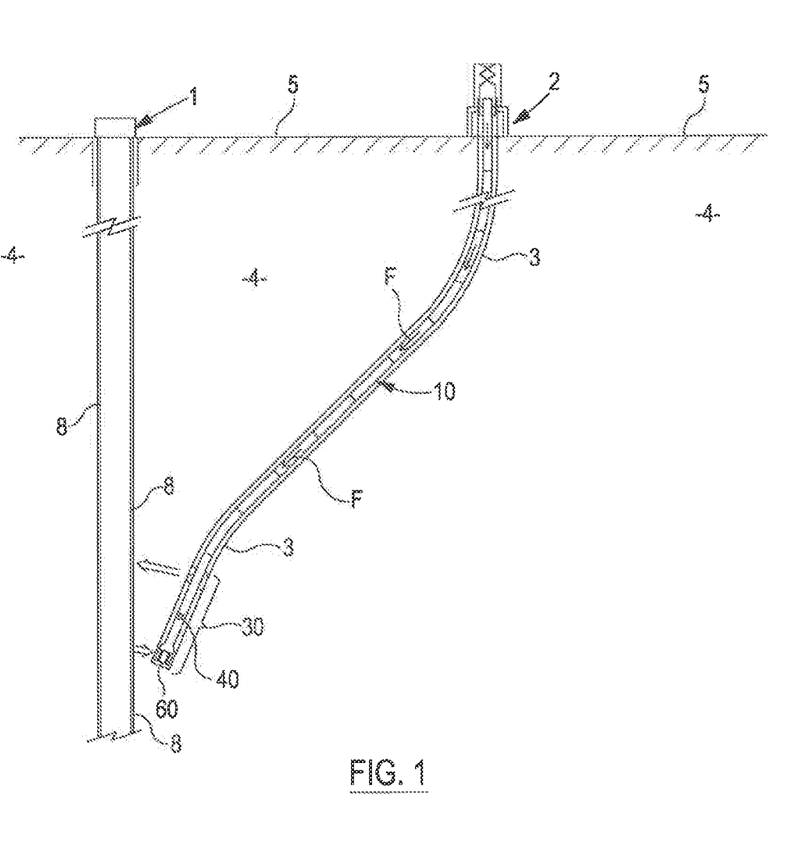
FIG. 1 is an overview representation of a drill string in a relief well during use for determining proximity and direction to a mother well according to an embodiment.
Figure 2:
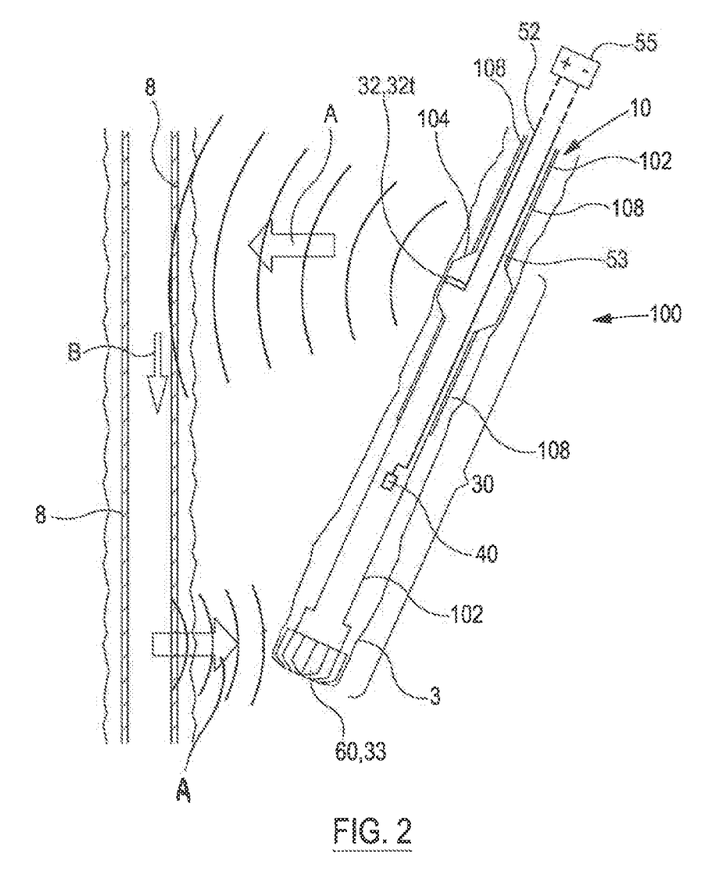
FIG. 2 is a close-up representation of the bottomhole assembly of the drill string of FIG. 1.

Referring to FIGS. 1 and 2, a rotary drill string 10 is located in a borehole 3 of a relief well 2 for extending the borehole.

The relief well 2 is sought to be extended by advancing the rotary drill string 10 into proximity of a mother well 1 and with such accuracy that at a desired depth beneath surface 5 the relief well 2, by way of further advancement of the drill string 10, can intersect the mother well 1. The drill bit 60 is typically advanced toward the casing 8 of the mother well 1 and directed to penetrate a wall of the casing to connect the relief well 2 to the mother well 1.

Once connected, the relief well 3 can be employed for example to perform a remedial operation on the mother well such as injecting high-density drilling fluid or cement through the relief well 2 for sealing off a section of the mother well 1. Such an operation may help to bring the mother well 1 under control, e.g. to stabilise pressure after a blowout or the like or other condition where access direct through the mother well 1 may not be practical, possible or desired.

In order to help to direct the drill bit 60 in the correct heading toward the mother well, the bottomhole assembly of the drill string 10 includes generally an electric current transmitter 30 and a magnetic field sensor 40. The transmitter 30 is integrated into the string and comprises a first electrode 32 which is provided by a discrete conductive wall terminal 32*t* which is disposed on an outer surface of the drill string and couples conductively to the subsurface 4 in use. A second electrode 33 of the transmitter 30 is spaced electrically isolated apart from the first electrode and is provided by the downhole end of the string, in this case by the drill bit 60, which couples conductively to the subsurface in use. Through this arrangement, the transmitter 30 is operable to establish current flow in the subsurface. A "circuit" of current is generated through the subsurface rock around the borehole 3 and the casing 8 of the mother well 1.

More specifically, an electric current can be injected by the transmitter 30 into the surrounding region of the subsurface at the wall terminal 32*t* with suitable strength to affect the casing 8 of the mother well 1 by propagation through the geological subsurface 4. As is typical of well design, the casing 8 of the mother well 1 comprises a metal tubular with high electrical conductivity. Current resulting from the injection is generated in the casing 8 and takes a path of least resistance along the casing 8 of the mother well, some "leakage" of the current into the subsurface around the mother well also occurring. The flow of current that is established is indicated generally by arrows A and B, where arrows A indicate the propagation of current through the subsurface rock structure and arrow B indicates the propagation of current along the metal casing 8 of the mother well 1.

As a result of the current flow in the material of the wall of the casing 8, a magnetic field is produced that is associated with the current flow in the casing 8. The magnetic field emanating from the casing 8 propagates through the subsurface rock and is received at the drill string 10 in the relief well 2. Components of the magnetic field are detected by the sensor 40 in the drill string 10, which for purposes of specific examples herein comprises magnetometers, e.g. flux gate magnetometers, arranged to detect amplitude and phase components of the magnetic field in three orthogonal directions. The magnetometer 40 is situated at a location along the string between the first and second electrodes 32, 33. This location corresponds to a region of strongly imparted current in the mother well casing 8.

By way of the sensor 40 therefore, magnetic field data are obtained that permit the direction and proximity to the mother well to be determined. An amplitude time series signal is recorded. Amplitude and phase components of the field are used to obtain the strength and direction of the field. The strength of the field, and hence measured amplitude, are proportional to the distance from, i.e. proximity to, the casing 8.

With regard to determining the direction to the casing 8, it can be noted that the transmitter 30 is used to generate current in the casing 8 of the mother well 1 which produces an "additional" magnetic field to the ambient magnetic field of the Earth. In the absence of such transmission, i.e. no power being delivered from the power source to the electrodes 32, 33, the magnetometers of the sensor 40 measure the ambient field of the Earth. The magnetometers are arranged to measure the field along three mutually perpendicular axes. The orientation of the magnetometers are determined relative to Magnetic North, which can be measured using a compass.

The components of the magnetic field from the magnetometers, e.g. in the direction along the borehole for the relief well, can thus also be determined with respect to magnetic north.

Upon transmission from the transmitter 30, the additional field from the casing of the mother well is produced, resulting in a total magnetic field which differs from that of the ambient field of the Earth which is originally measured. The measurements from the magnetometers in the presence of the new total field can be compared with those earlier obtained of the ambient field. The change in the field component 90 degree to the borehole before and after is indicative of where the mother well casing is located. This change can be measured as the azimuth (horizontal) angle relative to magnetic north.

The arrangement of the transmitter 30 and sensor 40 in the bottomhole assembly 100 of the drill string 10, can thus provide for accurate determination of the location of the drill bit 60 with respect to the casing 8 of the mother well that the drill bit 60 may be required to penetrate. The drill string 10 can also provide for efficient construction of the relief well 2 as additional runs for measurements of the direction and proximity to the mother well may be avoidable.

The data for determining the direction and proximity to the casing 8 is acquired from the transmitter 30 and sensor 40 when the bottomhole assembly is in situ within the relief well. As drilling progresses, the bottomhole region of the borehole 3 is generally in greatest or best proximity to the mother well for measurement, and the provision of the acquisition transmitter and sensor in the bottomhole assembly (in the bottomhole region of the wellbore) facilitates early identification of the mother well, given electrical power and signal control constraints. Early acquisition data can be combined with later data and can further increase accuracy of determinations of the direction and proximity to the mother well casing. Time in the well for measurement can also be maximised, such that multiple measurements from the transmitter and sensor are possible and can further increase accuracy or data certainty in the determination of direction and proximity to the mother well. Repeat measurements can be combined to reduce signal to noise ratios.

The current is transmitted into the subsurface as an alternating current signal with low frequency e.g. 0.25 Hz. To do so, the polarity of power supply may be switched repeatedly back and forth such that the first and second electrodes 32, 33 are switched from injector and receiver to receiver and injector, and back. The transmission at low frequency can increase the range of operation compared with higher frequencies due to the frequency dependent skin depth effect and attenuation at higher frequencies. However, higher frequencies than 0.25 Hz may be preferred when close to the mother well to facilitate increased accuracy in the determination of the direction and proximity to the casing 8.

The alternating current allows the signal produced by the casing to be detected in the presence of the ambient magnetic field of the Earth. The current signal can be extracted e.g. by Fourier transformation of the applied to the data collected at the sensor. Components of both the ambient field of the Earth and the low frequency signal in response to the current transmission can be obtained from the data from the magnetometer 40. By measuring the field of the Earth with respect to a component of the drill string the compass trajectory of the borehole 3 and/or heading of the drill bit 60 can be determined.

Looking now at FIG. 2 in more detail, the bottomhole assembly 100 of the drill string 10 has an elongate tubular 102 which is connected through pin and box connection (not shown) to a length of tubular drill pipe extending downhole from a drilling rig at a top of the well 2. Drilling fluid can be circulated from surface along an inside of the drill pipe, through an inside of the tubular 102, and into the borehole through an outlet in or near the drill bit 60. The drilling fluid can then flow upward along an outside of the drill string toward the surface.

The bottomhole assembly 100 includes a stabiliser 104 which protrude outward from an outer surface of the tubular 102. The stabiliser 104 can thus provide stand off for the tubular 102 from the inner wall of the borehole. The stabiliser 104 is arranged to make contact against the formation of the inner wall of the borehole 3 and help to centralise the tubular 102 and attached drill bit 60 within the borehole 3.

In the example of FIG. 2, the electrode 32 is disposed on the stabiliser 104. The electrode 32 comprises a terminal 32*t* which is arranged on an outer part of the stabiliser 104. Provision of the electrode 32 on the stabiliser 104 can in this manner position the electrode terminal 32*t* close to the borehole wall and subsurface rock formation into which the current is to propagate. This can enhance the electrical coupling to the subsurface.

The stabiliser 104 has ribs that extend along the tubular body and are spaced apart about the circumference of the tubular body 102. It can in this way permit return drilling fluid to pass along the outside of the tubular body 102 through flow passages between ribs. By providing the electrode 32 to position the terminal 32*t* against or close to the wall of the borehole, e.g. on an outer part of a rib of the stabiliser so as to face the wall, effects of the drilling fluid upon the coupling and/or propagation of the current in the subsurface can also be minimised.

In practice, the electrode terminal 32t could comprise a conductive termination of bare metal wire, discrete metal area on outer surface of the tubular, metal rod, or metal ring, or any other conductive termination structure providing suitable electrical coupling to the subsurface. The electrode 33 includes conductive metal drill bit parts, i.e. parts for drilling, in electrical coupling with the subsurface, and/or conductive metal outer walling of the drill bit sub or downhole tubular of the bottomhole assembly.

The electrode 32 is connected to a power source 55 through a first electric line 52 and the drill bit 60/second electrode 33 is connected in the example of FIGS. 1 and 2 through conductive components and walling of the string to the power source 55. The line 53 in FIG. 2 provides a connection of the sensor 40 to the power source 55 e.g. for power and signal transmission for operating the sensor 40. Depending on the switching state of the current signal to be transmitted into the subsurface, electrical power can thus be supplied through to the relevant one of the first and second electrodes 32, 33 for transmission of current into the subsurface.

It is sought to arrange the first electrode 32 to provide a localised point of injection of current. This can facilitate the proper emission of high-power, focused current signals. The outer surface of tubular body 102 at least in the regions along the string uphole and downhole of the electrode 32 (and thus in a region along the string between the first electrode 32 and the second electrode 33, 60) is arranged to be electrically insulated from its surroundings. These electrically insulated regions are indicated by reference numeral 108 in FIG. 2. This can facilitate that the tubular body 102 in the insulated regions 108 does not interfere to any significant extent with the propagation and transmission and reception of the current at the electrodes.

In this example, the tubular body 102 can comprise metal (e.g. conductive) pipe provided with insulating material in region 108 on an outer surface of the metal pipe. Hence, the region 108 provides the necessary insulation, with the electrode 32 being a localised point of current communication and electrical coupling with the subsurface.

In general, the electrode 32 and electrical current supply from source e.g. via electric line 52 is electrically insulated from the rest of the string, which may in general be electrically conductive.

In other variants, the tubular body 102 in the region 108 consists essentially of non-conductive material so as to provide the necessary insulation at regions 108.

In other variants also, it may be desirable for the tubular body 102 in region 108 to include wear surfaces of metal facing the wall of the wellbore for protection and/or resisting abrasion deterioration of the body 102. These surfaces can be provided by metal rings which circumferentially extend around the tubular body 102. They are insulated from the electrodes 32, 33 and from each other by virtue of being provided in discrete locations along the tubular body 102 and intermediate sections of the tubular body 102 consisting of non-conductive and insulative material. This avoids effects of the wear surfaces upon current transmission/ reception.

The insulative region 108 is provided to avoid injected current establishing a conductive path in the tubular 102, or other parts of the string, rather than in mother well casing 8. By suitable configuration of wear surfaces or other metal parts of the string in combination with insulation between and from the electrodes, current conduction in the body 102 may be minimised whilst still allowing wear performance.

The magnetometers of the sensor 40 are located in the bottomhole assembly between the electrode 32 and the drill bit 60. In other variants, the sensor 40 is located as close to the drill bit as possible, in the drill bit, or in drill bit sub. In order to facilitate such positioning, the drill bit 60 may in some examples be made and consist substantially of non-magnetic material, e.g. metal with low or no significant magnetic susceptibility, so as not to unduly affect the measurements of the magnetic field from the sensor 40. A suitable material for the drill bit or drill bit sub for such purposes may be for instance titanium, non-magnetic steel or other non-magnetic metal or metal alloy. The sensor 40 is preferably disposed on and symmetrically about the central long axis of the drill string and bottomhole assembly. This can reduce asymmetry effects of surrounding drill string components upon propagation of the field that is to be measured using the sensor 40.

The supply of electrical power to the transmitter 30 can be carried out in various ways. It can be appreciated that the electrodes 32, 33, the power supply 55, and first and second electric lines 52, 53 are indicated merely schematically in FIG. 2.

Figure 3:
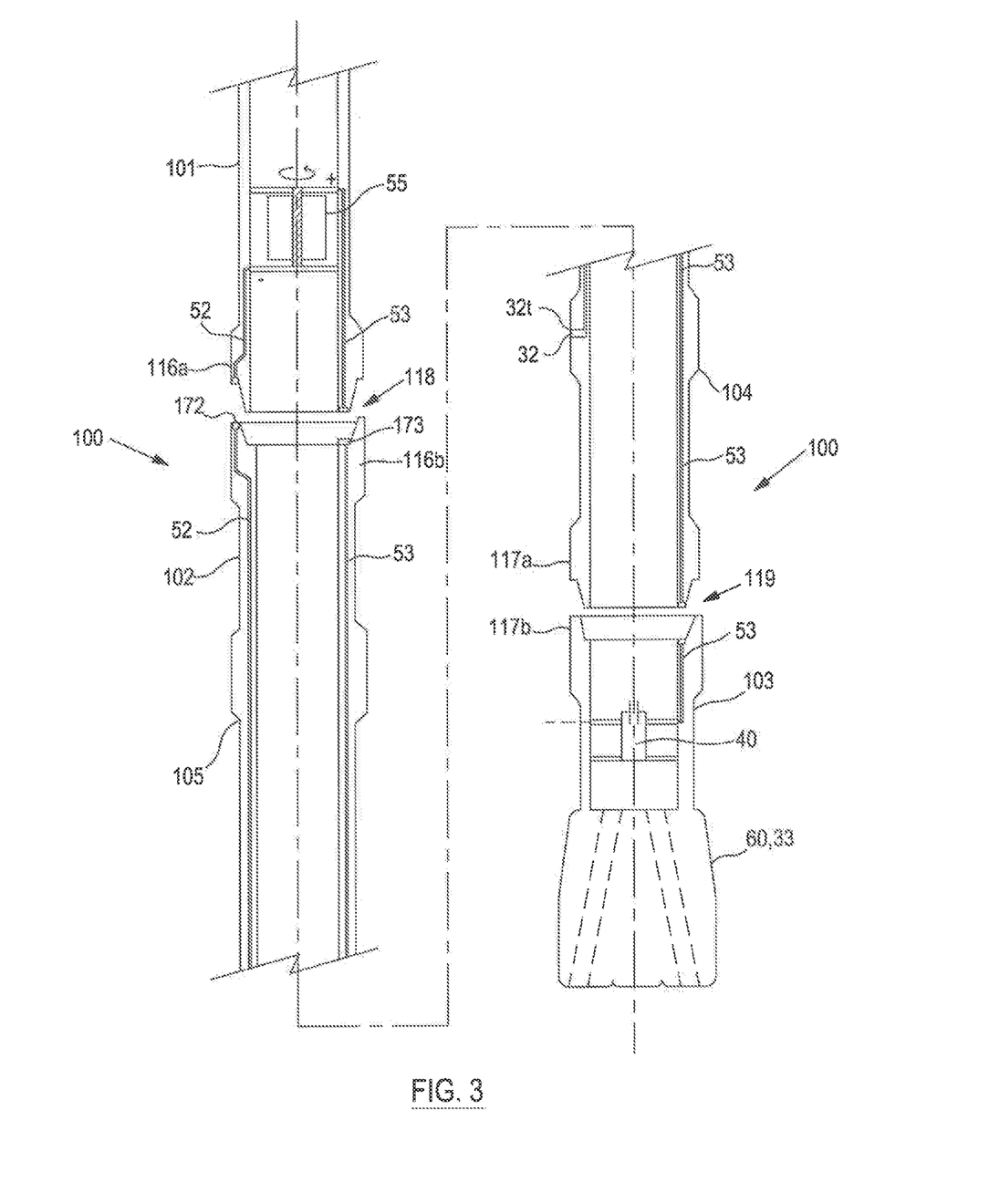
FIG. 3 is a representation of another bottomhole assembly for the drill string of FIG. 1 in close-up according to another embodiment.

In FIG. 3, a power supply 55 exemplified in the form of a turbine 55 is located in drill pipe 101 uphole from the bottomhole assembly 100. The bottomhole 100 assembly includes the tubular 102 which includes stabilisers 104, 105. The electrode 32 is disposed on the stabiliser 104. The bottomhole assembly 100 also includes a drill bit sub 103 which is to be coupled to the downhole end of the tubular 102. The sensor 40 is located near the drill bit in the drill bit sub 103. In this example, the first and second electric lines 52, 53 are wires embedded in the wall of the tubular 102. The first and second electric lines 52, 53 extend along the drill string to the power source 55. Electrical connection is obtained at joint locations 118, 119 to continue the electric lines along the string. As can be seen, the first electric line 53 is arranged to be continued between the tubular 102 and the drill bit sub 103, and both the first and second electric lines 52, 53 are arranged to be continued across the joint between the tubular 102 and the uphole drill pipe 101 of the string. The electric line 53 provides electrical connection to the wall material of the drill bit sub 103. The wall material of the drill bit sub and parts of the drill bit 60 which face the subsurface in use are conductive and arranged to function to provide the second electrode 33 of the transmitter.

Figure 6:
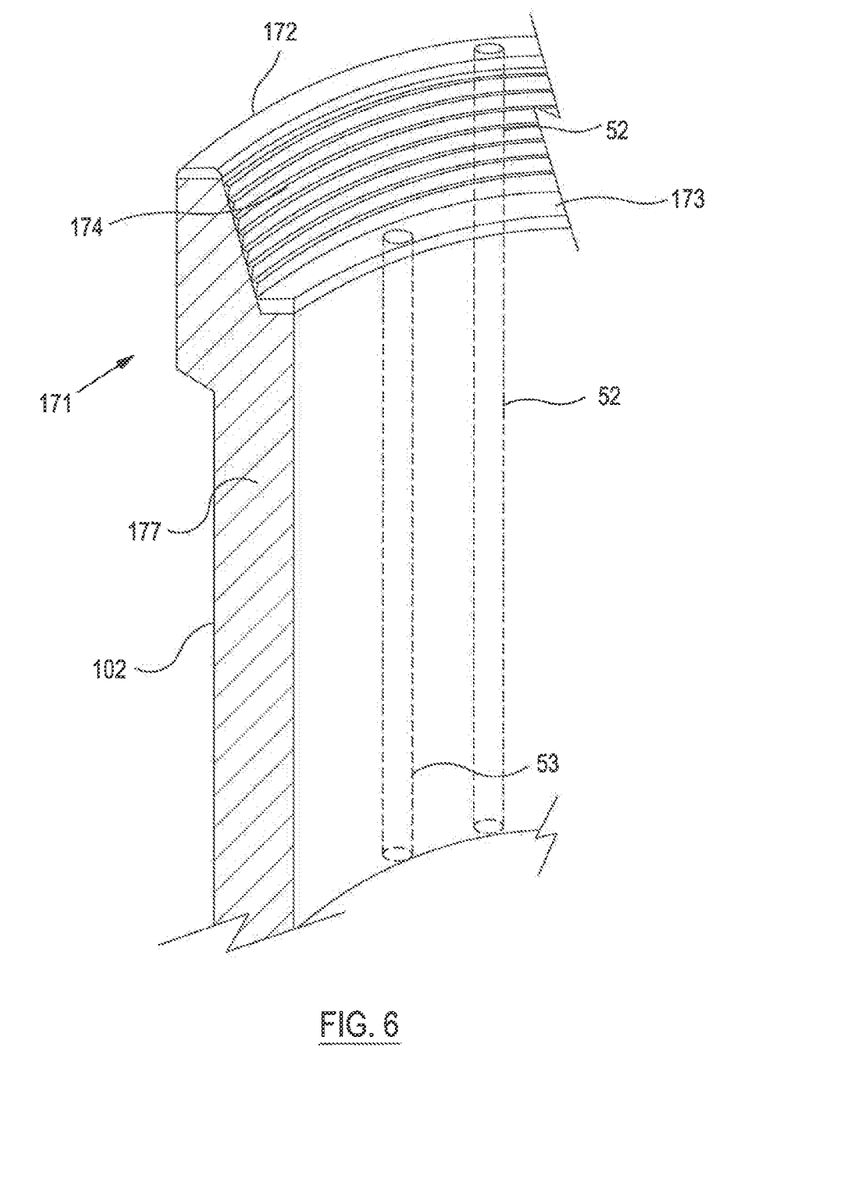
FIG. 6 is a part sectional perspective representation of part of a box end of a tubular for a drill string according to an embodiment of the invention.

FIG. 6 provides an example of how the electric lines 52, 53 may be embedded in the wall of the tubular 102 and connected to obtain the electrical connection across the joint 118 or 119. The end 171 of the tubular 102 has annular electrical contact surfaces 172, 173 which contact corresponding electrical contact surfaces of the adjacent tubular, e.g. drill pipe tubular 101, upon making up the joint 118. The wires of the electric lines 52, 53 are embedded in the wall and terminate at the upper end 171 of the tubular 102 in the respective electrical contact surfaces 172, 173. Both wires 52, 53 are included in FIG. 6 for purposed of illustrating their relationship to the contact surfaces 172, 173, but can as in the example of FIG. 3 in practice be placed in other positions such as on diametrically opposite sides of the tubular.

In embodiments where the material 177 of the wall of the tubular in which the wires are embedded is of conductive metal, the connectors 172, 173 can be insulated from one another and from the material 177 of the wall, e.g. by insulation layer. Alternatively, the one of the electrical contact surfaces 172, 173 can be coupled to the material 177 of the wall of the tubular 102 to transmit current in the material 177 of the wall, and through the joint 118, 119 to the adjacent section connecting to the end 171.

The wires 52, 53 are insulated from one another. In the example of FIG. 3, they are insulated by virtue of the tubular body 102 consisting of material 177 which is non-conductive. In this way, the tubular body 102 and conducting wires in regions above between and below the electrode 32 are also insulated from the surrounding region around the bottomhole assembly.

In various other examples, the tubular body 102 and its adjacent sections 101 and 103 up hole and downhole are conductive metal bodies, and in such cases, and more generally, the wires of the electric lines 52, 53 can be insulated wires sheathed with insulating sleeves. In such cases, as mentioned above, additional insulative layers or material may be applied to the outside of the tubular body and adjacent sections to obtain necessary electrical insulation from the surroundings.

Figure 7:
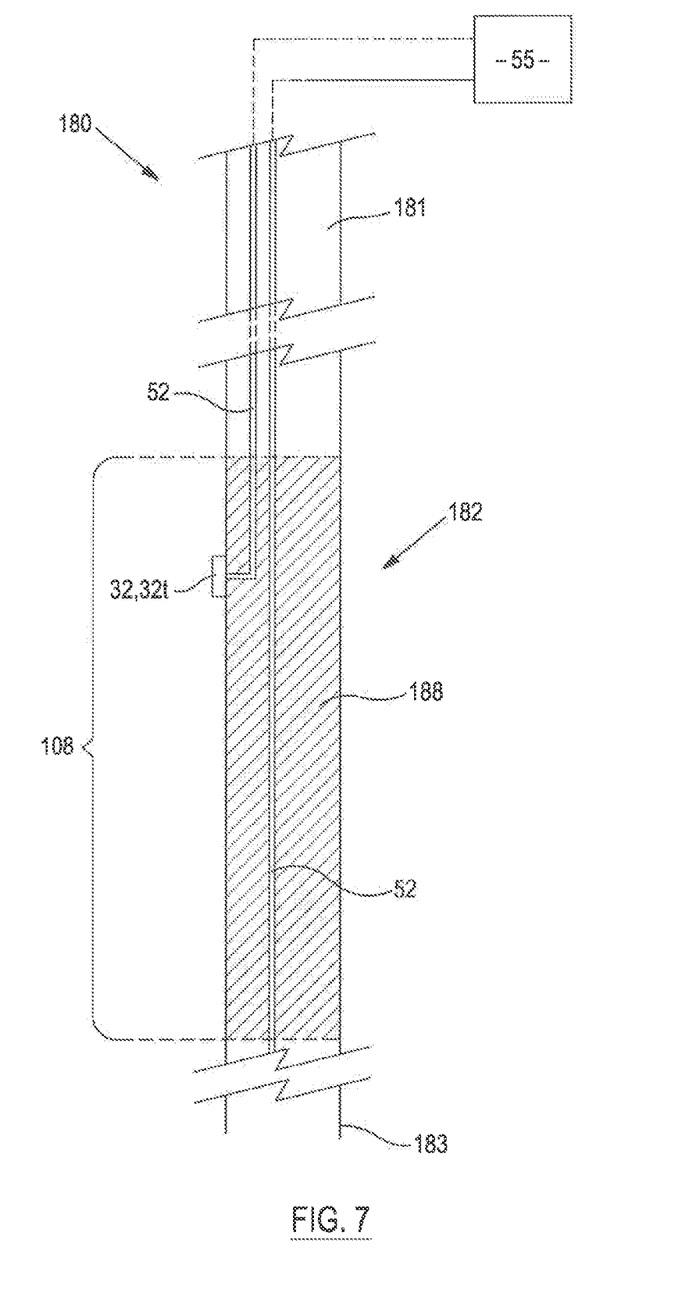
FIG. 7 is a sectional schematic representation of part of the tubular walling of the drill string according to an embodiment of the invention.
Figure 8:
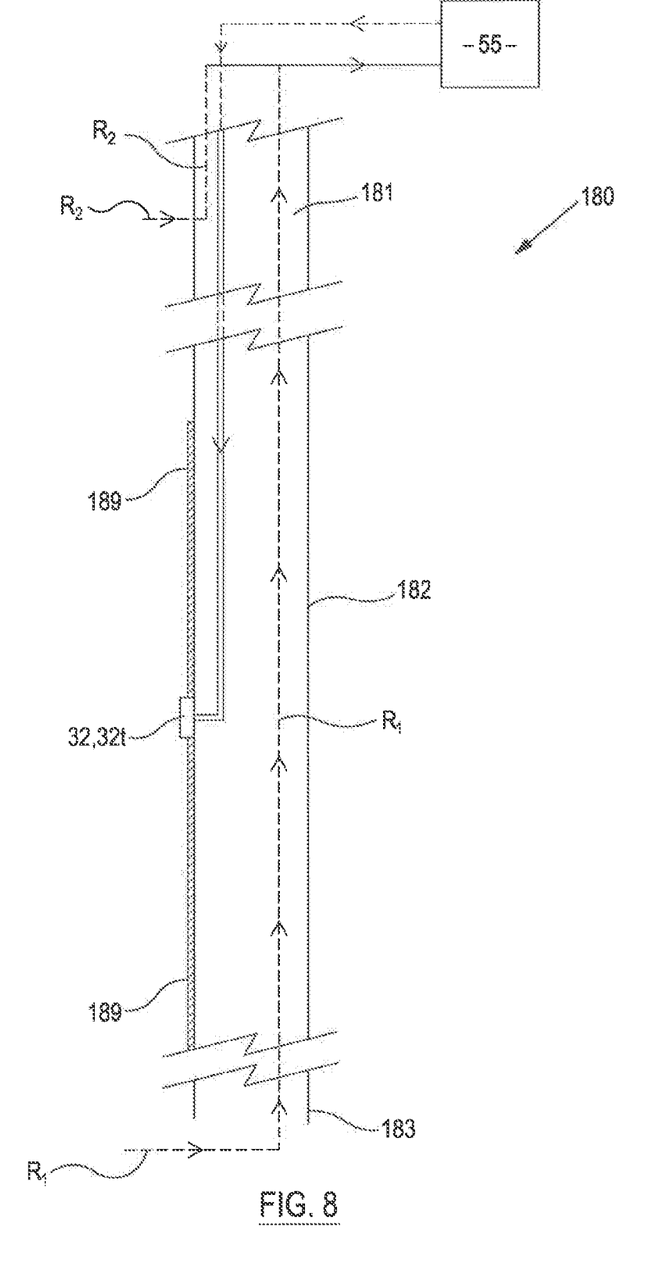
FIG. 8 is a sectional schematic representation of part of the tubular walling of a drill string according to another embodiment.
Figure 9:
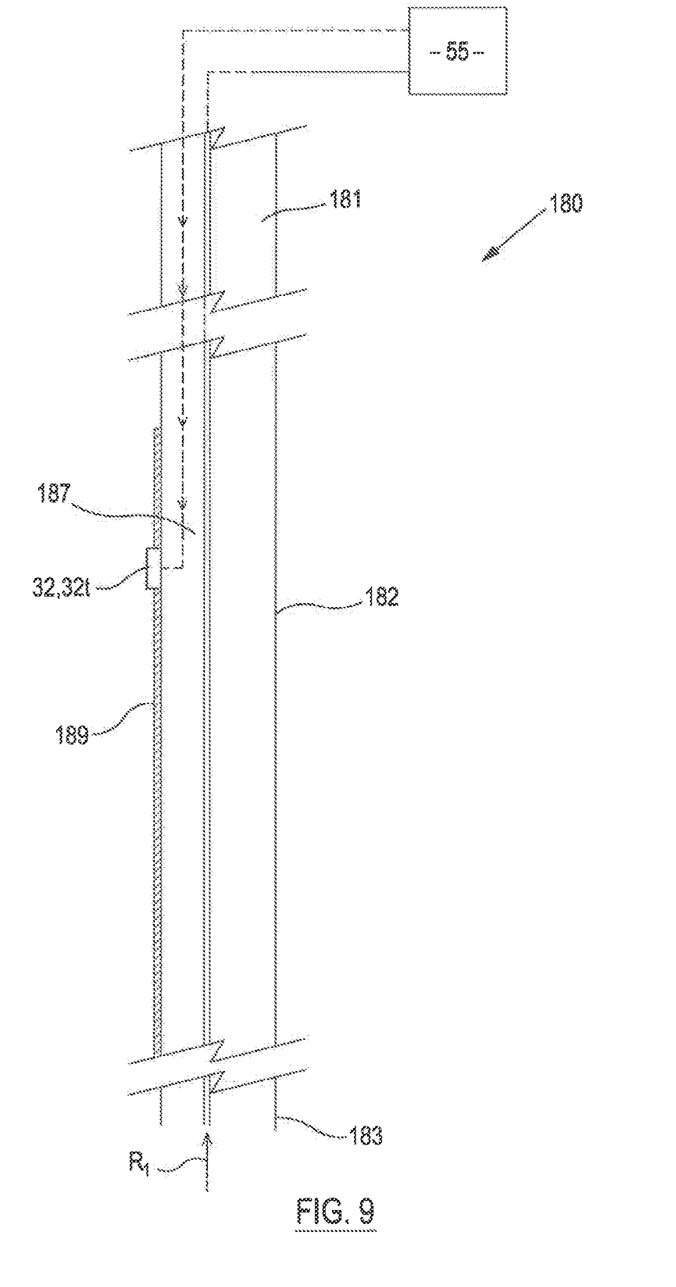
FIG. 9 is a sectional schematic representation of part of the tubular walling of a drill string according to anther embodiment.

With reference to FIGS. 7 to 9, some further examples are described to facilitate an understanding of the manner in which the transmitter 30 in particular could in some variants be employed in the drill string.

In FIG. 7, walling of a tubular drill string is depicted generally at 180. The walling 180 has an upper wall section 181, an intermediate wall section 182, and a lower wall section 183 which together form a continuous length along the string. The walling 180 is generally configured similarly to that of the example of FIG. 3 above. The first electrode 32 of a current transmitter 30 is depicted in position on an outer portion of the walling of wall section 182. In the region 108, the material of the intermediate wall section 181 consists of non-conductive material, e.g. titanium, non-magnetic steel, or the like, so that the electrode terminal 32t is coupled to the surroundings of the drill string wall at a discrete location on the string, e.g. as a band or discrete conductive area within the non-conductive material. The non-magnetic region 108 extends downhole and uphole from the electrode 32. Electrical communication in the non-magnetic section takes place through wires 52, 53 along the wall and embedded within the material in the intermediate wall section 182.

The material of the tubular in the upper and lower wall sections 181, 183 can conduct electrical current, but is not required in this particular example to utilise this ability of the wall section 181 as current is conducted through dedicated wires 52, 53. However, the wire 53 is connected to the wall material of section 183 so as to allow electrical returns through the wall section 183 and then through the section 182 through the wire 53.

In FIG. 8, walling 180 of tubular drill string is arranged so as to conduct current in the material of the wall of the tubular in each of the wall sections 181, 182, 183. The outer surface of the drill string has an insulative layer 189 around the tubular and first electrode 32 is arranged to couple electrically with the surroundings for transmitting current into the subsurface. In this example, current return from the subsurface when injecting current from the electrode 32 is taken through the material of the wall of the tubular on current return path $R_1$. This is achieved by virtue of the walling of lower wall section(s) 183 being connected to the second electrode 33, e.g. the drill bit, sub, tubular or electrically conductive parts of the bit or downhole walling thereof, in electrical coupling to the subsurface. The lower wall section 183 in effect acting as a receive electrode. Current return from the subsurface when injecting current into subsurface from the electrode 32 can also, to some extent, be taken through the material of the wall of the tubular on current return path $R_2$. However, when approaching the mother well, current flow is preferred on return path $R_1$. This is achieved by the walling of upper wall section(s) 181 being coupled electrically to the subsurface, e.g. in contact with subsurface fluid and/or rock. The upper wall section 181 then in effect also acts as a receiver electrode.

The lower wall section(s) 183 can be a section of the drill bit sub 103. In practice, the drill bit sub or the drill bit itself, can be the second electrode of the transmitter for the electrical return path $R_1$, providing it is constructed of metal which is conductive and couples suitably to the subsurface. In such an implementation, the sensor 40 can be placed in a non-magnetic section of the string, and sufficiently away from the bit as avoid effects of the material of the drill bit or drill bit sub interfere with the detection of the magnetic field.

Figure 10:
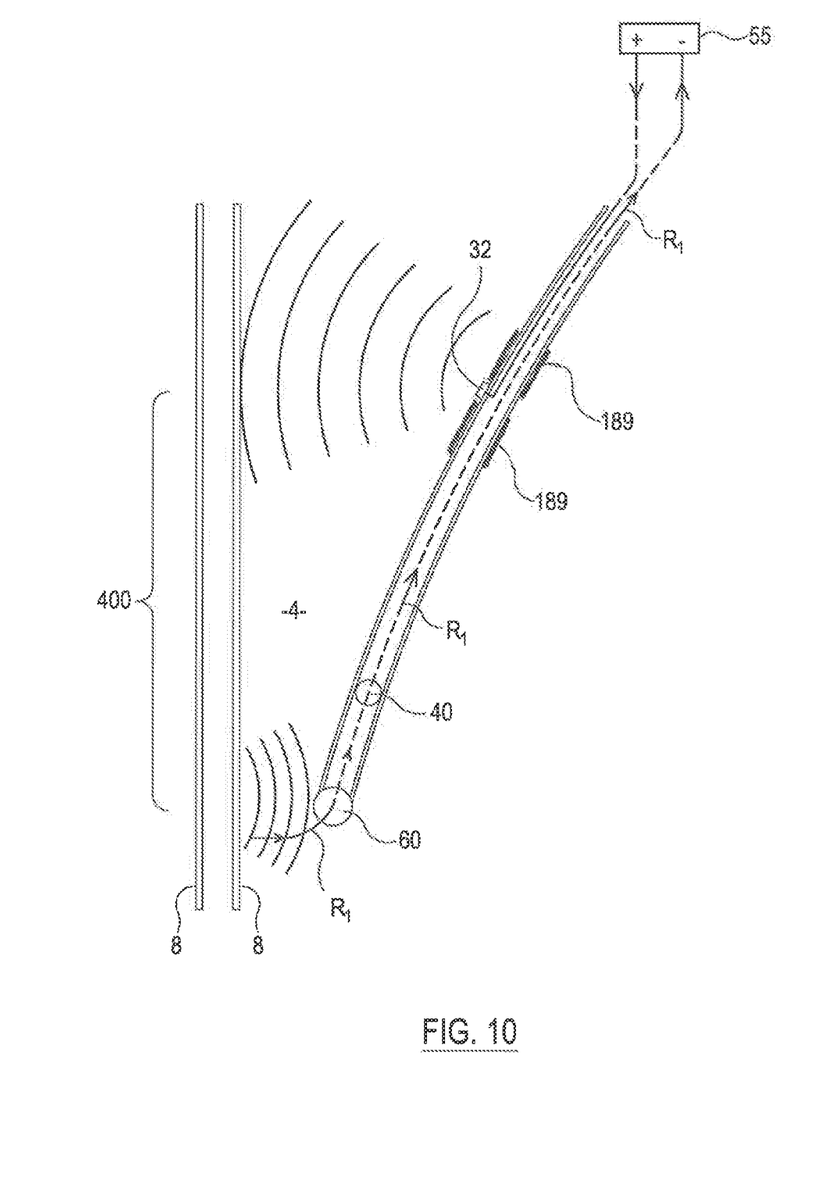
FIG. 10 is a schematic of the drill string of FIG. 8 in use at smaller scale.

Importantly, upon approach to the mother well 1, use the lower wall section 183 or drill bit to return electrical current from the subsurface can be advantageous. An electrical circuit is powered by the power source, current being injected through the electrodes, transmitted along the casing of the mother well, and returned through the string from the subsurface on the path $R_1$. On approach toward the mother well 1, the relief well is deviated and long axis of the string is inclined at an angle with respect to the mother well casing. The greatest resistance is in the formation. Hence, the return current will mainly be close to the drill bit since the distance to the mother well is shortest there. The main current circuit is set up closer to the end of the string on path R1 and an earlier detection of the distance to the "mother well" can be obtained. The general arrangement is illustrated further in FIG. 10. Preferably, the sensor 40 is positioned downhole of the electrode 32. This can be a preferred position for the sensor 40 as it generally corresponds to the distance of the mother well with greatest imparted current and strongest generated magnetic field. Some current may be returned outside the distance 400 of large current in the mother well, i.e. up-string of the injecting electrodes. However, this current in the inclined approach toward the mother well 1 will have only a small strength and will therefore provide only a small magnetic field.

An advantage of using the uninsulated sections to act as electrodes can be improved coupling to the earths subsurface. In particular, the drill bit is designed to be in firm contact against the formation in use, and therefore may provide particularly good coupling to the subsurface for setting up the generation of the magnetic field to be measured. They represent relatively large conductive bodies in the generally resistive subsurface 4 which may favour current flow.

In variants of this, a yet further return path may be provided, where instead of the $R_1$ return through the drill pipe the return current is received by a section of casing in the relief borehole or by another component, e.g. a structure at surface such as on the seabed or on the wellhead of the mother well, providing that the section of casing or other component couples electrically with the subsurface of the earth and connect to the power source 55.

In FIG. 9, walling 180 of tubular drill string is arranged so as to conduct current in the material of the wall of the tubular to the first electrode 32 in the intermediate wall section 182. The electrode 32 is directly connected to the material 187 of the wall of the tubular in which current can propagate. The electrical power may be supplied through the wall to the electrode 32 to inject current into the subsurface (and when oppositely polarised during the alternation of the signals may receive return current). The electrode terminal 32*t* is provided as a discrete electrical surface, e.g. a break in the insulation layer 189, facing the surroundings of the subsurface into which the borehole of the relief well is drilled. The magnetic field produced from the generated current in the casing of the mother well is measured using the magnetometers. The direct coupling in this example may allow embedded wiring requirements to be reduced as the wall material 187 replaces the function of the electric line 52. This can simplify components and reduce capital costs, or allow other an electric line to be employed for other purposes.

Electrical power and communication data is supplied to the magnetometers of the sensor 40 through the electric line 53 or through a separate line connecting to the power source 55. The magnetometers run on DC. To this end, the current from electric line 52 may be converted from AC to DC, e.g. by rectifier. Communication with the magnetometer is superimposed high frequency information which can readily be extracted from the current signal. Data from the sensor can be communicated over separate data line (not shown) and/or by telemetry system (not shown) to surface.

Different power supplies or power supply systems may be utilised. In other variants, the power supply 55 is a battery that can be combined with a DC to AC and/or switching circuitry for producing suitable low-frequency transmission into the surface via transmitter 23. Electrical power from the power supply 55 may be supplied through the drilled wellbore through cables and/or tubular walls of string from surface power supply.

Electrical power can also be generated downhole in the relief well, e.g. using a turbine system which converts hydraulic flow to electrical current. A converter on the drill string can then be used to convert the generated power to a low-frequency AC, e.g. square pulse, which is transmitted via the electrode 32. It is desirable to be able to select to not send electrical power to the electrodes. This can be controlled from surface, e.g. by communication of control pulse to the power supply system. In embodiments where power is generated downhole, it is not necessary to supply power electrically through string from surface, and only telemetry is needed for data communication for control purposes.

Furthermore, an electrical accumulator can also be disposed downhole, e.g. on the drill string. The accumulator can be useful both in the example of supplying power from surface and downhole generation of power, if it is not possible to generate enough power. In such case, power can be produced and stored, and then used when enough power is available from the accumulator. Then, power can be generated and accumulated again, and so on repeatedly during the process.

In use, drilling progresses initially by rotating the string and a drill bit to cut through the rock and drill a section of borehole. Drilling fluid is circulated down the drill string through an inside of the connected sections of drill pipe and out into the wellbore through an outlet near the drill bit in the bottomhole assembly. When sought to determine precisely the direction and proximity to the mother well, the drilling, i.e. rotation and advancement of string, is paused, and while paused and in location in the borehole, power is delivered to the injector electrode in the bottomhole assembly, and the current is injected into the subsurface from the injector electrode. While paused however, drilling fluid may continue to circulate and power the power-generating turbine 55. The sensor 40 is used to detect components of the magnetic field from the current generated in the casing of the mother well, and the data from the sensor is used to determine the direction and proximity to the mother well by appropriate processing and/or analysis of the data.

The data are typically communicated in real time or near real time by telemetry from a telemetry transmitter in the bottomhole assembly to a telemetry receiver further uphole and/or at surface. Various telemetry techniques may be employed. For example, mud-pulse telemetry or the like may be used. The mud pulse technique can typically involve transmitting about 20 pulses per second and requires full circulation of drilling fluid/mud to be possible. In this technique, one would typically need to wait a period of time for data to been sent uphole from the borehole, processed, and correctional information then sent back down to the directional drilling system for adjusting the heading of the drill bit.

Wired telemetry is another option which provides high-speed transmission of data typically in kHz band. Wireless telemetry is another alternative. Data transmission by telemetry can nowadays take place while the string rotates. Telemetry may also be used for communication of control signals to the power supply and magnetometers.

Based on the data and/or the direction or proximity determined for the mother well the drilling is resumed and the direction that the drill bit is headed is changed or performed accordingly, e.g. if needed to direct it toward the target location e.g. or "hit" the casing of the mother wellbore in the precise desired location.

Alternatively, the transmission of current and measurement of the magnetic field takes place when the string and drill bit is being rotated and advances into the subsurface. High-speed real-time telemetry of data to surface and/or communication to the directional drilling system to provide correctional or steering information can facilitate accuracy and shorten the overall length of the drilling process further. Many data points can thus advantageously be obtained on the trajectory of the borehole of the relief well as it is drilled, for quick/immediate updating direction of drilling as the borehole of the relief well is extended in the subsurface.

In embodiments such as those described with reference to FIGS. 1 to 3, the electrode 32 is disposed on a stabiliser, and the electrode 33 can be provided by parts of the drill bit 60. However, these are mere examples. The electrodes 32, 33 in other variants may be placed in or provided by other structures of the bottomhole assembly with similar effect. For example, collars 116*a*, 116*b*, 117*a*, 117*b* on ends of the tubular sections to be joined at joints 118, 119 can be utilised for the provision of a terminal 32*t* of the electrode 32. In one possible example, the collar 117*a* includes the first electrode 32 on the outer surfaces of those collars 116*a*, 117*a*.

Acquisition of this "ranging data" by transmission of current and detection of the resulting magnetic field from the mother well is performed intermittently as the drill string advances subsurface towards its final intended location at or near the mother well. The determinations are generally more accurate the closer the mother well it comes, and the frequency may be increased the closer the mother well it comes to increase accuracy further of any determinations of the proximity and direction to the mother well.

Figure 4:
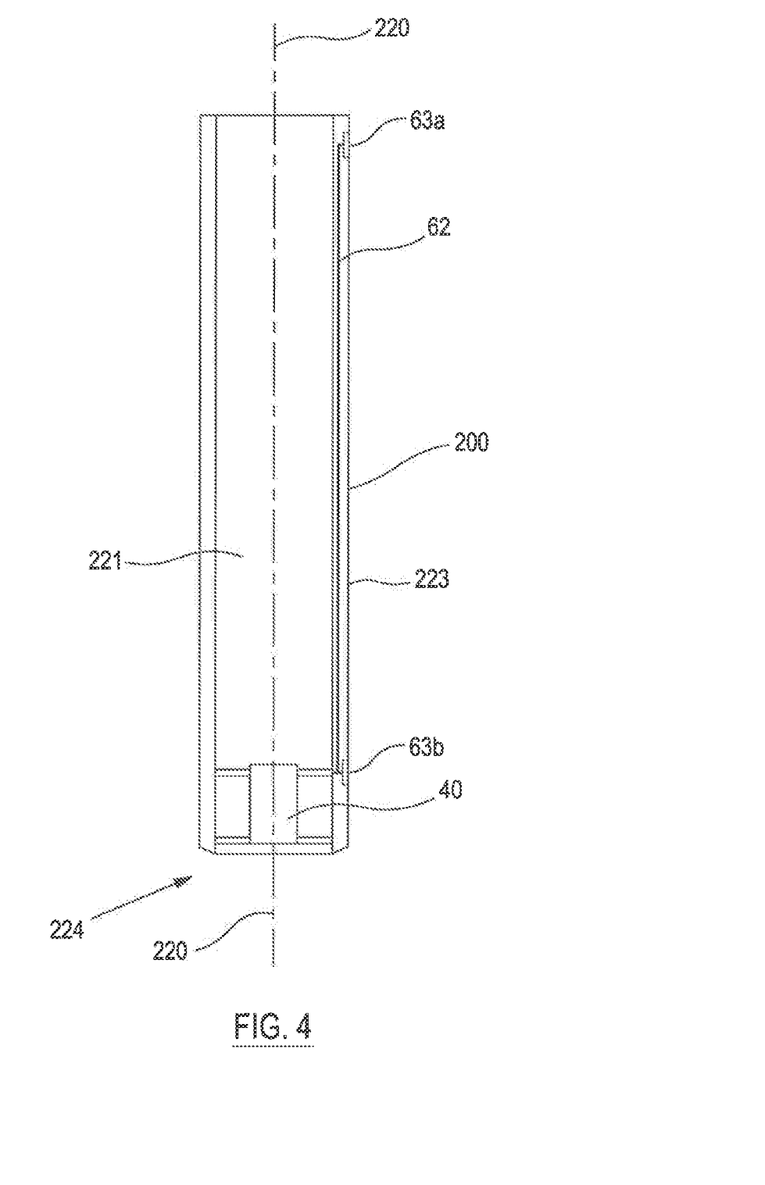
FIG. 4 is a representation of an insert for a bottomhole assembly of a drill string according to another embodiment.

Referring to FIG. 4, an insert 200 is depicted for insertion into the bottomhole assembly 100. The insert 200 is removable from the bottomhole assembly, e.g. in the event the drill bit is to be replaced. The insert 200 is in the form of a tubular sleeve within which the sensor 40 is positioned centrally on longitudinal axis 220 within the end-to-end through bore 221 of the sleeve. An electric line 62 for supplying power to the sensor 40 is embedded in a wall 223 of the sleeve. The electric line 62 extends upward to connector terminal 63a and downward to terminal 63b.

Figure 5:
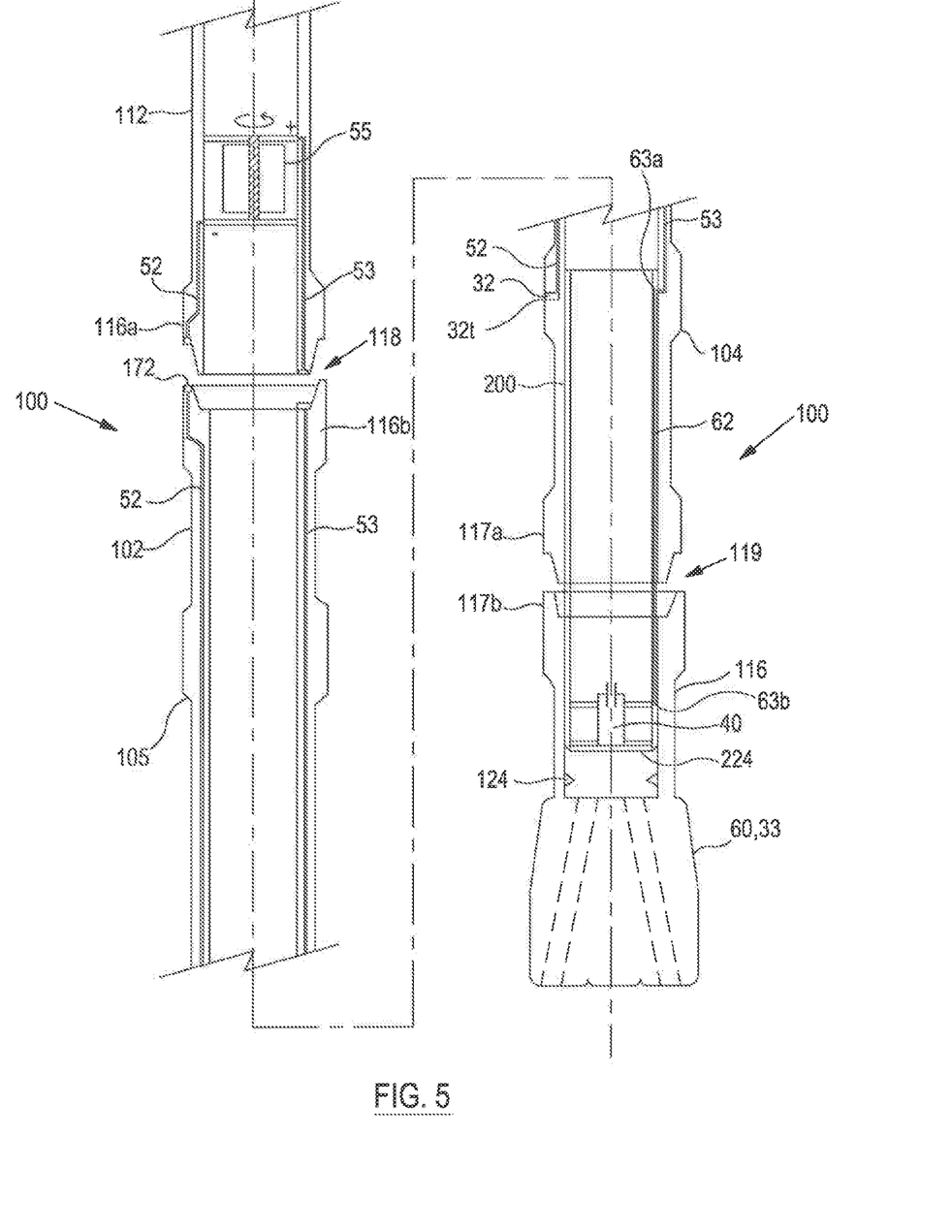
FIG. 5 is a representation of the insert of FIG. 4 inserted in a bottomhole assembly.

In FIG. 5, the insert 200 is shown in position within the bottomhole assembly 100 where the connector terminal 63a is aligned with a corresponding connector in the wall of the tubular body 102 adapted to connect to the electrode or electric line 53. The terminal 63b connects to wall material of the drill bit sub 103 for electrical returns. When the joint 119 is made up, the end 224 of the insert abuts a surface extending inward on the inner wall of the drill bit sub 116. In this way the insert can be inserted. In practice, the joint 119 could be made up before inserting the insert, and the insert 200 lowered into position through the tubular body 102. In other variants, the insert 200 may include other components necessary for transmission and reception of current through electrodes 32, 33 in addition to the sensor. In an embodiment the insert includes the power supply 55, e.g. battery, and termination and electric lines in the wall both for connecting to the first electrode (such as line 62) and the second electrode 33 when inserted into place.

In further embodiments therefore, the insert comprises an entirely self-contained tool including the transmitter, sensor, and power supply to be removably incorporated into the bottomhole as a removable insert for use in facilitating detection and drilling of the relief well.

The drill string tubulars into which the insert is inserted in such case preferably includes an electric connection and electrode in coupling relationship with the subsurface to enable injection and reception of current.

In further embodiments still, a dedicated self-contained tool sub comprises a tubular including the transmitter 30 with first and second electrodes 32, 33, sensor 40, and power supply 55, and connecting ends (e.g. box and pin sections) can be provided for incorporation of the sub into a bottomhole assembly or standard drill string.

In the above, a transmitter and sensor for "ranging" purposes is incorporated into drill string. This can have significant advantages in the reduction in cost and drilling time, and accuracy of ranging. The arrangement of electrodes of the transmitter on components such as drill bit, stabilisers, collars or the like which are to come into contact with the walls of the borehole can enhance coupling to subsurface to provide increased effectiveness. Placement in and adaptation of the bottomhole assembly accordingly can increase data accuracy as to the position of the bit relative to the mother well casing.

The invention claimed is:

1. A method of extending a borehole for a well in a subsurface of the Earth, the method comprising the steps of:
    (a) providing a rotary drill string in the borehole, wherein the rotary drill string includes a bottomhole assembly, and the bottomhole assembly includes at least one tubular or sub and a drill bit connected to an end of the tubular or sub;
    (b) injecting current into the subsurface using at least one electrode disposed on the tubular or sub, thereby generating current in a casing of another well which is located a distance away from the borehole of the well, wherein the electrode is supplied with electrical power from a power source at surface, and the tubular or sub has a length uphole of the electrode that is nonconductive or electrically insulated from the subsurface surroundings and a length downhole of the electrode that is nonconductive or electrically insulated from the subsurface surroundings, for localized injection of current from the electrode into the subsurface, and wherein return electrical current from the subsurface is returned from downhole of the electrode through at least one part the drill bit, or through walling of the tubular or sub, in electrical coupling with the subsurface;
    (c) detecting at least one component of a magnetic field which is associated with the current generated in the casing, using at least one sensor disposed on a length of the rotary drill string between the electrode and the drill bit or a length through which electrical current is returned;
    (d) obtaining data from the sensor for determining either or both the proximity and direction to the other well;
    (e) advancing the drill string into the subsurface based upon the obtained data to extend the borehole, and
    (f) simultaneously, rotating the drill string to drill a section of the borehole and injecting current into the subsurface.

2. The method as claimed in claim 1, wherein the sensor is positioned in the bottomhole assembly in any of: the drill bit; a drill bit sub, or a location along the drill string between the drill bit and the electrode.

3. The method as claimed in claim 2, wherein the sensor comprises at least one magnetometer, and the method further comprises using the magnetometer to detect the component of the magnetic field.

4. The method as claimed in claim 1, which further comprises rotating the drill string to drill a section of the borehole and advance the drill string in the subsurface.

5. The method as claimed in claim 1, which further comprises pausing rotation of the drill string and injecting the current into the subsurface in the pause.

6. The method as claimed in claim 5, wherein the data from the sensor is obtained in the pause.

7. The method as claimed in claim 1, which further comprises rotating the drill string to drill a section of the borehole, wherein the data is obtained from the sensor simultaneously to rotation of the drill string.

8. The method as claimed in claim 1, wherein the method comprises communicating or streaming the data from the sensor toward surface using telemetry.

9. The method as claimed in claim 1, which further comprises processing the data from the sensor to determine the proximity and/or direction to the casing of the other well.

10. The method as claimed in claim 1, which further comprises transmitting correctional data based on the processed data to a directional drilling system to adjust a heading of the drill string.

11. The method as claimed in claim 1, which includes injecting current alternatingly into the subsurface through first or second electrodes.

12. The method as claimed in claim 1, which includes conducting return current from the subsurface through any of: at least one electrode; the drill bit; and a conductive outer wall portion of any of the drill string, the bottomhole assembly, and a tubular or a drill bit sub thereof.

13. The method as claimed in claim 1, wherein the injected current comprises an alternating current signal having a frequency of 1 Hz or lower, for example 0.5 Hz or lower, or 0.25 Hz or lower.

* * * * *